(12) United States Patent
Feinbloom et al.

(10) Patent No.: US 9,924,083 B1
(45) Date of Patent: Mar. 20, 2018

(54) SYSTEM FOR CAMERA VIEWING AND ILLUMINATION ALIGNMENT

(71) Applicant: Designs for Vision, Inc., Ronkonkomo, NY (US)

(72) Inventors: Richard E. Feinbloom, New York, NY (US); Kenneth Braganca, Sayville, NY (US); Roma Montifar, Elmhurst, NY (US)

(73) Assignee: DESIGNS FOR VISION, Inc., Bohemia, NY (US)

( * ) Notice: Subject to any disclaimer, the term of this patent is extended or adjusted under 35 U.S.C. 154(b) by 0 days.

(21) Appl. No.: 15/152,506

(22) Filed: May 11, 2016

Related U.S. Application Data

(60) Division of application No. 14/280,576, filed on May 17, 2014, now Pat. No. 9,369,617, which is a continuation-in-part of application No. 14/087,322, filed on Nov. 22, 2013, now Pat. No. 9,219,849.

(51) Int. Cl.
*H04N 5/225* (2006.01)
*G03B 17/56* (2006.01)

(52) U.S. Cl.
CPC ......... *H04N 5/2256* (2013.01); *G03B 17/566* (2013.01); *H04N 5/2252* (2013.01)

(58) Field of Classification Search
CPC ............ H04M 1/02681; H04N 5/2251; H04N 5/2252; H04N 5/2256; G03B 17/02; G03B 17/08; G03B 17/48; G03B 2217/00; G03B 2217/002; G03B 29/00; A63F 13/213; A63F 2009/2435; B60R 2300/10; B60S 1/0848; B66F 11/048; G06F 1/1605; G06F 1/1607; A61F 2/644; A61F 2/68; A61F 2002/30069; A61F 2002/30276; A61F 2230/0086; A61F 2002/5003; A61F 2002/5007; A61F 2220/0025; A61F 2002/3052
See application file for complete search history.

(56) References Cited

U.S. PATENT DOCUMENTS

| | | |
|---|---|---|
| 3,120,161 A | 2/1964 | Pickens |
| 3,830,230 A | 8/1974 | Chester |
| 3,893,145 A | 7/1975 | King |
| 4,021,824 A | 5/1977 | Uchiyama |
| 4,025,933 A | 5/1977 | Berg |
| 4,081,814 A | 3/1978 | Bulland |
| 4,195,918 A | 4/1980 | Freche |

(Continued)

*Primary Examiner* — Roberto Velez
*Assistant Examiner* — Tuan Le
(74) *Attorney, Agent, or Firm* — Law Office of Carl Giordano PA

(57) ABSTRACT

A system for aligning a camera view and the illumination of a lighting fixture is disclosed. The system includes a camera contained with a housing and a lighting fixture that is pivotedly attached to the housing. An angle adjuster attached to a proximate end of each of the housing and the lighting fixture converts a linear movement to the adjuster into an angular adjustment of the lighting fixture with regard to an optical axis of a camera contained with the housing. In another aspect of the invention, the system of aligning a camera view and light fixture may be attached to a magnification lenswear and a focal point of the magnification lenswear may be aligned with the aligned camera view and the illumination of the lighting fixture.

8 Claims, 12 Drawing Sheets

(56) References Cited

U.S. PATENT DOCUMENTS

| | | |
|---|---|---|
| 4,616,257 A | 10/1986 | Kloots |
| 4,621,283 A | 11/1986 | Feinbloom |
| 4,797,736 A | 1/1989 | Kloots |
| 5,142,947 A * | 9/1992 | Wang .................... B23D 63/14 451/374 |
| 5,430,620 A | 7/1995 | Li |
| 5,722,762 A | 3/1998 | Soll |
| 5,870,166 A | 2/1999 | Chang |
| 6,224,227 B1 | 5/2001 | Klootz |
| 6,493,136 B2 | 12/2002 | Chang |
| 6,854,902 B2 | 2/2005 | Marek |
| 7,008,074 B1 | 3/2006 | Halm |
| 7,645,050 B2 | 1/2010 | Wilt |
| 8,068,169 B2 | 11/2011 | Chang |
| 8,289,443 B2 | 10/2012 | MacKenzie |
| 2002/0122691 A1 * | 9/2002 | Wood ................... F16B 5/0685 403/381 |
| 2007/0013865 A1 | 1/2007 | Jordan |
| 2007/0127250 A1 | 6/2007 | Walters |
| 2008/0204589 A1 * | 8/2008 | Chang ................. H04N 5/2251 348/373 |
| 2009/0302177 A1 * | 12/2009 | Chang ................. G10D 13/065 248/186.1 |
| 2010/0100197 A1 * | 4/2010 | Kremser ................ A61F 2/644 623/38 |
| 2010/0238270 A1 | 9/2010 | Bjelkhagen |
| 2010/0247256 A1 * | 9/2010 | Katzenberger .......... B23B 29/02 408/1 BD |

\* cited by examiner

SYSTEM FOR CAMERA VIEWING AND ILLUMINATION ALIGNMENT

CLAIM OF PRIORITY

This application claims, pursuant to 35 USC 120, as a Divisional application priority to, and the benefit of the earlier filing date of, that patent application entitled "System for Camera Viewing and Illumination Alignment," filed on May 17, 2014, which claimed, pursuant to 35 USC 120, as continuation-in-part, priority to, and the benefit of the earlier filing date of, that patent application entitled "System for Camera Viewing and Illumination Alignment," filed on Nov. 22, 2013 and afforded Ser. No. 14/087,322, the content of which is incorporated by reference, herein.

BACKGROUND

Field of the Invention

The present application relates to the field of optical magnification devices and more particularly to a system for alignment of a camera viewed with magnification devices with a light source.

Background

Video cameras continue to become smaller and more useful in recording events as they occur. In the field of surgery, for example, doctors use video recording to record operations for subsequent viewing by students, for learning purposes, and insurance companies, for malpractice avoidance.

Generally, the video cameras that are used are mounted to the doctor's head or glasses to provide a view of what the doctor is seeing. In addition, a light may also be attached to the video camera in order to light the area in which the user is viewing.

However, when the doctor is performing microsurgery or dental surgery, magnification devices are typically employed. These magnification devices generally limit the doctor's view to a very small area. In this case, any misalignment of the doctor's optical view, the camera's optical view or projected light can cause video recording of an area that is not being viewed by the doctor or not lighting the doctor's viewing area.

Thus, the benefits achieved by the video recording may be negated.

Hence, there is a need in the industry for a system and method of providing and maintaining precise alignment of the optical viewing angles of the doctor and the video recording device.

SUMMARY

It is the object of the present invention to provide a system for providing and maintaining a precise alignment of a camera's view and an intended lighted area.

It is another object of the present invention to maintain a fixed positional relationship between a video recorder optical view and a lighted area.

In one embodiment of the invention, an apparatus disclosed that provides alignment between a camera and a light, the apparatus comprising a housing containing a camera therein, said camera having a known focal length, said housing comprising a first cavity and a second cavity at a proximate end of said housing, wherein a passage is formed between said first cavity and said second cavity; a light fixture pivotedly attached to said housing at a substantially distal end of each of the housing and the light fixture; and an adjustment mechanism comprising: a vertical follower, pivotedly attached to a proximal end of said light fixture, said vertical follower including a threaded passage therethrough, said threaded passage having a known pitch; a retaining nut, contained in said first cavity, said retaining nut including an internal thread of said known pitch, a compression spring having a first end in contact with a closed end of said second cavity and a bottom surface of said vertical follower; and a lead screw, extending through said vertical follower, said compression spring and said passage to said retaining nut, said lead screw having a thread matching said internal thread.

It is an object of the invention to provide a means for adjusting and fixing a lighting device and a viewing field of a camera to a focal point of a telescopic lens.

It is an object of the invention to provide an adjustment arrangement that provides for adjustment of a camera viewing field with a focal point of a telescopic lens.

It is an object of the invention to provide an adjustment arrangement that retains an established orientation of a telescopic lens and a visual capture device.

In one aspect of the invention an adjustment and locking device is disclosed. The adjustment and locking device comprises a housing and an adjustment device comprising: a first part attached to said housing, the first part including a first interleaving part extending from the housing, the first interleaving part having a throughhole substantially perpendicular to a direction of the first interleaving part, and a second part comprising a second interleaving part comprising a first throughhole, wherein the second part is rotably attached to the first part about a pin inserted in the throughhole and the first through hole, wherein an orientation of the first part and the second part is fixed by engagement of a screw through a proximal end of the housing to said pin.

BRIEF DESCRIPTION OF THE DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the accompanying drawings.

It is noted that the drawings of the invention are not to scale. The drawings are intended to depict only typical aspects of the invention, and therefore should not be considered as limiting the scope of the invention. In the drawings, like numbers represent like elements between the drawings.

It is to be understood that the figures and descriptions of the present invention described herein have been simplified to illustrate the elements that are relevant for a clear understanding of the present invention, while eliminating, for purposes of clarity many other elements. However, because these omitted elements are well-known in the art, and because they do not facilitate a better understanding of the present invention, a discussion of such element is not provided herein. The disclosure herein is directed to also variations and modifications known to those skilled in the art.

DETAILED DESCRIPTION OF THE INVENTION

Figure 1:
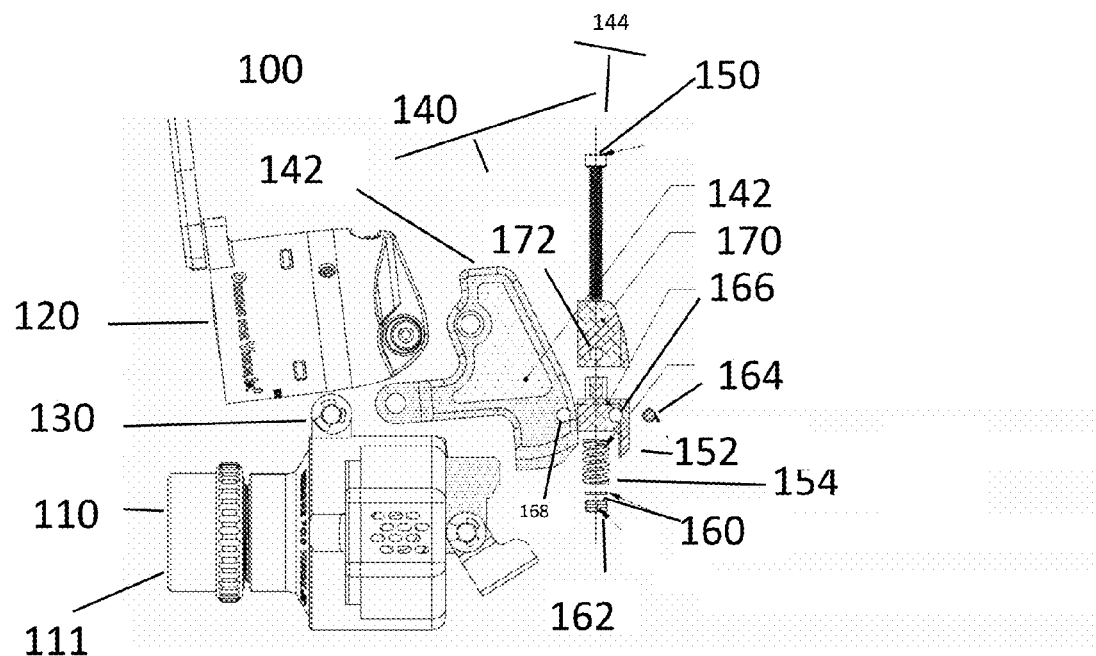
FIG. 1 illustrates an exploded cross section view of an alignment mechanism according to an aspect of the invention.

Referring to FIG. 1, there is shown a cross sectional view of an unassembled device 100 in accordance with the principles of the invention.

FIG. 1, illustrates a camera/light combination device 100 comprising a camera housing 110 (including a camera 111, therein), and a light assembly 120. Also shown is a pivot mechanism 130 attached to a substantially distal end of each of the light assembly 120 and the camera housing 110. Pivot mechanism 130 allows for a change in angle between the camera housing 110 and the light 120. Further illustrated is an alignment mechanism 140 that controls and retains a set angle between camera housing 110 and light 120, such that the illumination provided by light 120 is maintained at a desired point (e.g., a focal point of camera 111).

Alignment mechanism 140 includes a housing 142 and an adjustment mechanism 144. Housing 142 engages pivot mechanism 130 attached to camera housing 110. Housing 142 rotates about pivot mechanism 130 in order to vary or change the angle of light 120 relative to a reference line (e.g., an optical axis of camera 111). Thus, alignment means 140 controls the orientation of light 120 with respect to camera 110.

Adjustment mechanism 144 is pivotedly attached to housing 142. Adjustment mechanism 144 controls and maintains the orientation of housing 142, and consequently, the orientation of light 120 with respect to camera housing 110.

Adjustment mechanism 144 includes a lead screw 150, a vertical follower 152, a vertical follower cover 170 and spring 154, wherein vertical flower 152 and vertical follower cover 170 includes a passage (not shown) to allow insertion of lead screw 150. Lead screw 150 enables linear actuation of the threaded vertical follower 152 in a vertical direction. Vertical follower 152 is threaded such that vertical follower 152 moves vertically along the lead screw 150 and, consequently, vary an angle of the light 120 with respect to the orientation of the camera housing 110. Spring 154 retains rigidity of the adjustment mechanism 144 by providing vertical pressure on a bottom face of vertical follower 152 (see FIG. 4).

Also shown are washer 160 and nut 162. Washer 160 minimizes surface wear between nut 162 and camera housing 110. Nut 162 captures lead screw 150 and allows for the turning of lead screw 150, which causes vertical movement of vertical follower 152 (and cover 172).

Also shown is attachment (dowel) pin 164 that attaches the adjustment mechanism 144 to housing 142 through recess 168 in housing 142 and recess 166 in vertical follower 152. Vertical follower cover 170 is attached to vertical follower 152) through set screw 172. Vertical follower cover 170, thus, moves vertically as vertical follower 152 moves along lead screw 150.

Dowel pin 164 enables vertical follower 152 to pivot in order to retain a substantially vertical position relative to housing 142 as lead screw 150 is adjusted (i.e., turned) and orientation of light fixture 120 with camera housing 110 changes.

Figure 2:
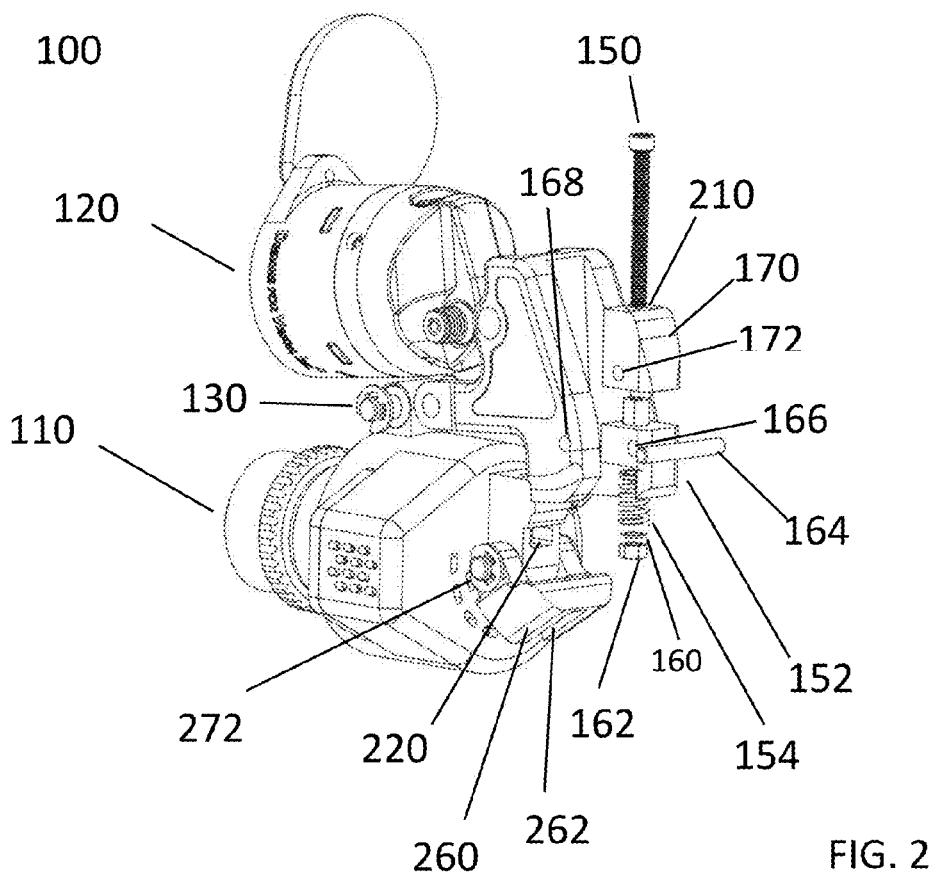
FIG. 2 illustrates a prospective assembled view of the device illustrated in FIG. 1.

FIG. 2 illustrates a prospective view of the camera/light assembly 100 in accordance with the principles of the invention.

Also shown is an exploded view of the attachment of pivot point 130 with housing 142 and an exploded view of alignment mechanism 140.

Also shown is a passage 210 in vertical follower cover 170 and vertical follower 152 through which lead screw 150 passes. Also shown is spring 154 and nut 162 through which lead screw 150 passes. Spring 154 engages a bottom surface of vertical follower 152.

Also shown is cavity 220 in camera housing 110. Cavity 220 captures and retains nut 162 within camera housing 110.

Figure 3:
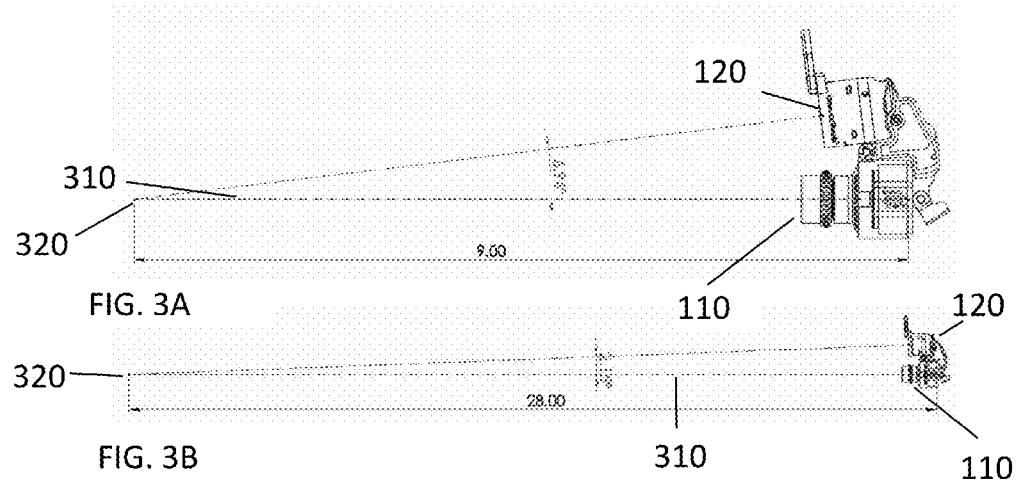
FIGS. 3A and 3B illustrate exemplary angular offsets according to an aspect of the invention.

FIGS. 3A and 3B illustrate angular orientation of the light 120 with regard to the optical axis of camera 110 at two different distances (e.g., the focal points 320); 9 inches and 28 inches.

In this illustrative embodiment, the angular orientation of light 120 with respect to the optical axis of camera 110 varies from 6.9 degrees at 9 inches to 2.15 degrees at 28 inches. The vertical and substantially liner motion of lead screw 150 causes an angular (and non-linear) motion of light 120 with respect to optical axis 310 of camera 111.

As would be appreciated, the angular orientation of light 120 with respect to the optical axis of camera 111, at one or more distances from the camera housing 110, is also based on a distance between a center point of the optical axis 310 of the camera 111 and a center point of light projection of light 120. Hence, the range (i.e., 9-28 inches) discussed herein is solely to illustrate a range (distance) and present the subject matter claimed as the invention. Thus, changes in the height of the vertical follower 152, which rides on the lead screw 150, adjusts the angle of the light 120 relative to the optical axis 310 of the camera 111, such that a substantially maximum illumination is presented at the focal point of camera 111.

Thus, in accordance with the principles of the invention, the angular orientation between light 120 and camera 111 may be set, and retained, at a specific angle that is based on a specific distance from the camera lens.

Figure 4:
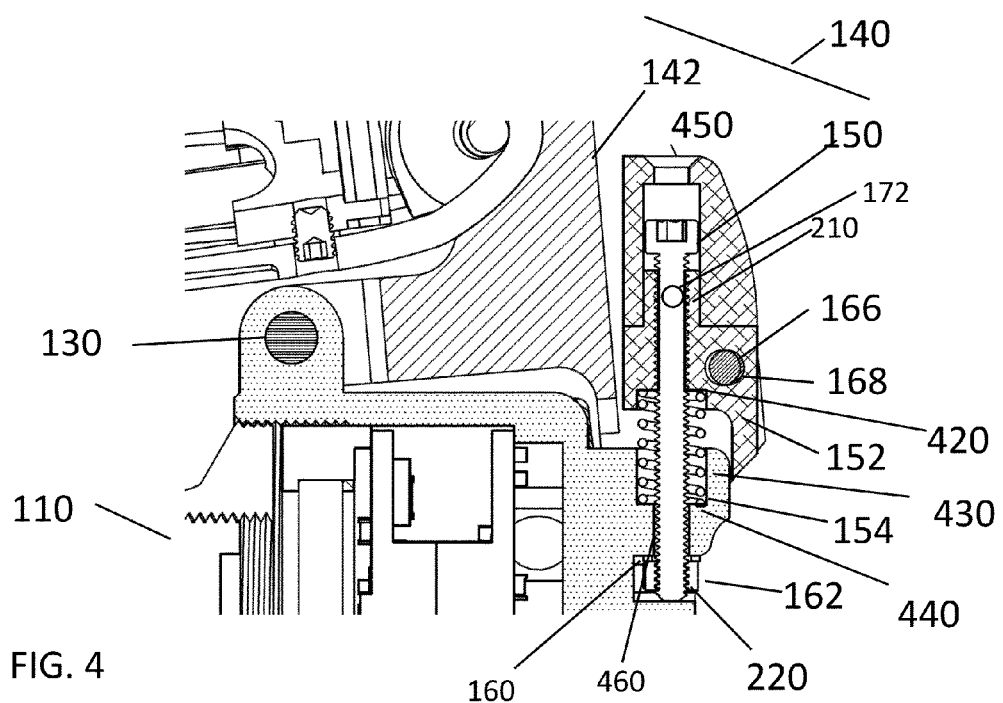
FIG. 4 illustrates a cross-sectional, assembled view of the device illustrated in FIG. 3.

FIG. 4 illustrates an detailed cross-sectional view of the alignment mechanism 140 showing lead screw 150 engaging nut 162 and being retained by compression spring 154 between a bottom surface 420 of vertical follower 152 and camera housing 110. Also shown is housing 142, which pivots about pivot point 130, as lead screw 150 engages nut 162 and vertical follower 152 travels vertically along lead screw 150.

Further illustrated is cavity 220 in camera housing 110 retaining nut 162, which retains lead screw in a desired position. Cavity 220 allows lead screw 150 to turn but not advance in its position with regard to nut 162.

Also shown is a second cavity 430 in camera housing 110. Second cavity 430, which is substantially perpendicular to the first cavity 220, captures spring 154 to retain spring 154 in tension between a surface of camera housing 110 (e.g., surface 440 of second cavity 430) and bottom surface 420 of vertical follower 152.

Also shown is passage 460 through camera housing 110 that connects second cavity 430 with first cavity 220. Passage 460 allows lead screw 150 to connect to nut 162 in first cavity 220. Passage 460 may in one aspect of the invention be threaded, with a thread comparable to that of lead screw 150. In another aspect of the invention, passage 460 may be smooth to allow lead screw 150 to pass through to engage retaining nut 162.

Also shown is screw head 450, which is used to adjust the adjustment mechanism by turning lead screw 150. Screw head 450 may be one of a slotted, Phillips, hex, knurled, etc., which allows turning of lead screw 150.

As would be appreciated the incremental change in orientation of housing 142 about pivot point 130 is determined based at least on a tread sizing (i.e., treads per inch) and the length of lead screw 150. For example, using a treading size of 80 treads per inch, a quarter-turn of the lead screw 150 may result in an incremental distance change in the order of one-half (½) inch. Note, that the incremental distance change is a non-linear function of the rotation of the lead screw 150. Thus, at a close range or distance (e.g., 9 inches) a one-quarter turn rotation of lead screw 150 results in change of distance that is different than a similar one-quarter turn rotation of lead screw 150 at a further distance. (e.g., 28 inches). Hence, the pitch of lead screw 150 is determined based on a desired rate of angular change of the light 120 with regard to a rotational change of the lead screw 150.

The sizing of lead screw 150 at 80 threads per inch is merely one of an example, and it would be recognized that other thread sizing may be incorporated without altering the scope of the invention.

Returning to FIG. 2, there is also shown a second attachment means 260. In this illustrated case, the second attachment means 260 includes a slotted or "T" attachment 262 that may be used to attach or mate with an external "T" (not shown). Attachment means 260 may be used to attach the completed device 100 to a second device (not shown). For example, device 100 may be attached to the bridge of eyeglasses using second attachment means 260. Or device 100 may be attached to a head set (or head band) using second attachment means 260.

In addition, second attachment means 260 may be fixedly attached to a proximate end of the housing 110. Alternatively, the second attachment means 260 may be pivotedly attached to housing 110 (as shown in FIG. 2) to housing 110.

In an alternative embodiment, the second attachment means 260 may represent a screw type mechanism that may include a screw and fixed surface. The screw retains device 100 in place by the screw applying pressure to a bridge of an eyeglass captured between the screw and the fixed surface.

As discussed, assembly 100 may be attached to the bridge of eyeglasses using second attachment means 260, such that a focal point 320 (FIG. 3A) of the device 100 shown in FIG. 1 may be coincident to a focal point of telescopic lens, for example.

Figure 10:
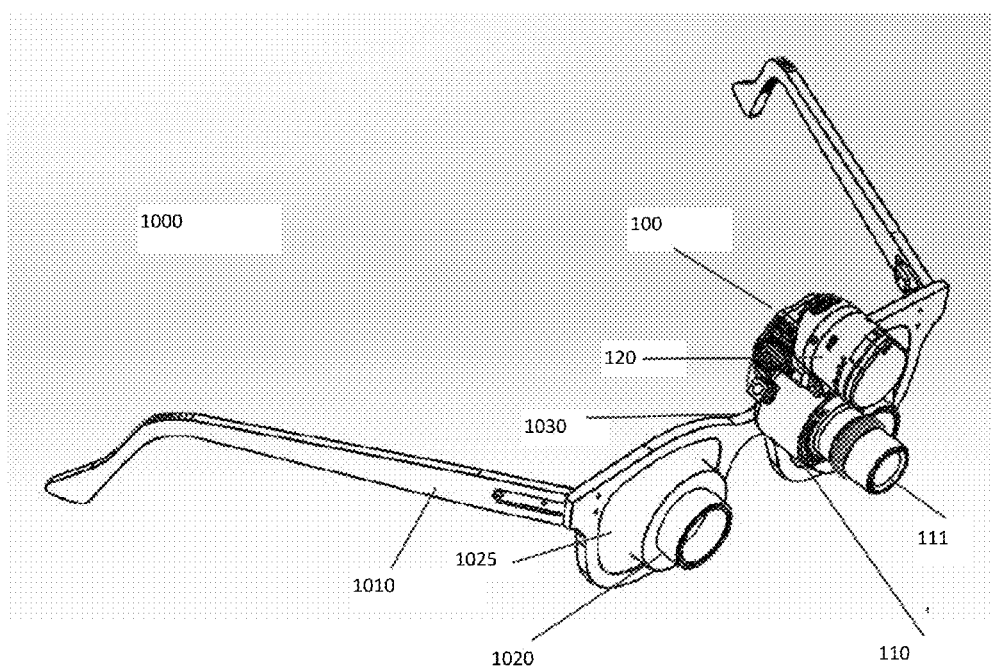
FIG. 10 illustrates an exemplary application of the adjustment and locking mechanism in accordance with the principles of the invention.

FIG. 10 illustrates an exemplary configuration 1000 of the incorporation of device 100 onto eye glass wear in accordance with the principles of the invention. In this illustrated configuration eyewear 1010 includes telescopic lens 1020 incorporated into lens 1025. Device 100, composed of light assembly 120 and camera 111 (contained within housing 110), which has been previously described, is attached to the bridge 1030 between the lens 1025.

As discussed with regard to FIGS. 3A, 3B, device 100 includes adjustment means to fix the light generated by light 120 to be coincident with the viewing point of camera 111.

Figure 11:
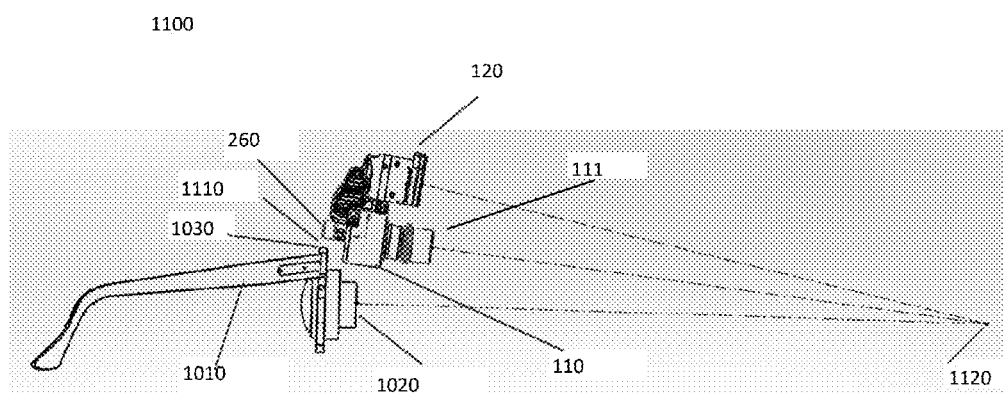
FIG. 11 illustrates an exemplary angular offset according to an aspect of the invention.

FIG. 11 illustrates an exemplary configuration 1100 illustrating the convergence of the light generated by light assembly 120, the viewing field of camera 111 with the focal point 1120 of telescopic lens 1020, in accordance with the principles of the invention. In this illustrative embodiment, attachment means 260 is shown engaging a connector 1110 on bridge 1030.

Hence, after light assembly 120 is adjusted to be coincident with the viewing field of camera 111, the device 100 (i.e., combined camera 111, light assembly 120) may be aligned with the focal point 1120 of telescopic lens 1020.

Figure 5:
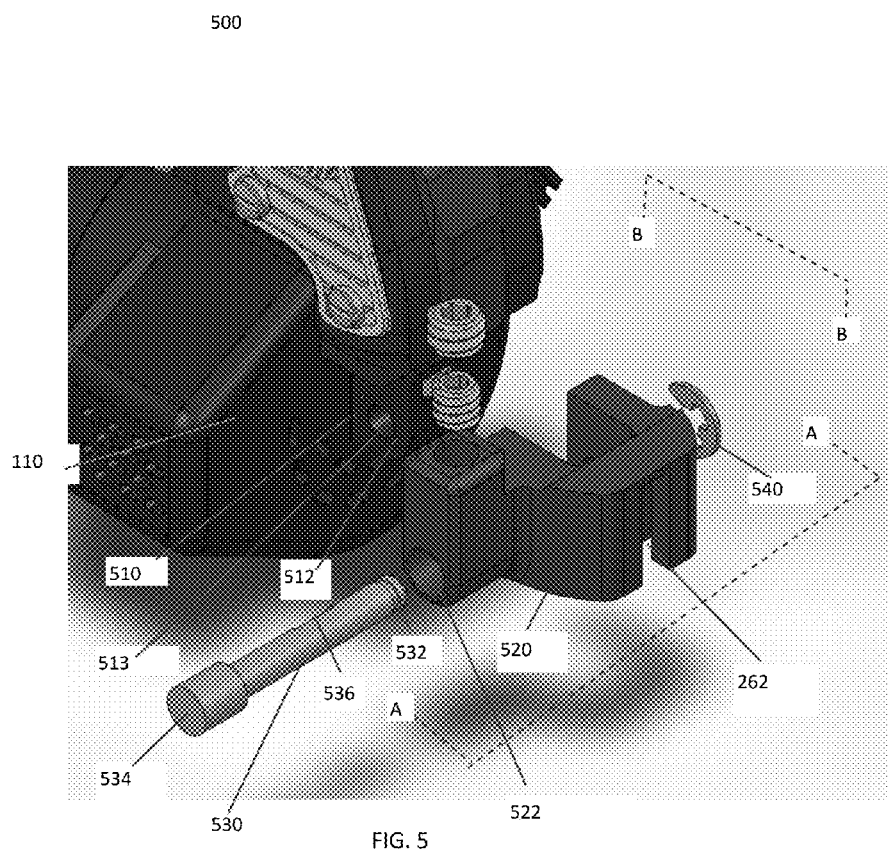
FIG. 5 illustrates an exploded perspective view of the adjustment and locking mechanism in accordance with the principles of the invention.

FIG. 5 illustrates an exemplary embodiment of attachment means 260 that allows adjusting and locking device 100 to be adjusted such that a focal point of device 100 is coincident with a focal point 1120 of telescopic lens 1020. Telescopic lens 1020, which may be used for medical and dental surgery, may, for example, be similar to those manufactured by the assignee of the instant application wherein telescopic lens are incorporated into eyewear that allow the surgeon or dentist to focus on, and magnify, a desired point in space.

In this illustrated example, attachment means 260 includes the T-slot attachment 262, as previously discussed. Attachment means 260 may be composed of two interleaved elements, 510 and 520. Element 510, referred to hereinafter as a body attachment, includes at a fixed section 512 extending from element 510. Fixed section 512 includes a connection or throughhole 513. Body attachment 510 may be permanently attached to housing 110. For example, body attachment 510 may be held by a screw attachment (not shown) in which the body attachment 510 is attached by screws that may extend from an inner surface of housing 110 into body attachment 510. Alternately, body element 510 may be an integral part of housing 110. (see FIG. 6).

Element 520, referred to hereinafter as bridge attachment, includes at least one interleaving element (not shown) that engages, by being interleaved with, fixed section 512. Body attachment 510 and bridge attachment 520 may be interconnected about a pivot axis through their corresponding interleaving elements. For example, insertion of pin 530 into the throughhole 513 enables body element 510 and bridge element 520 to be rotatable with respect to each other.

As shown, pin 530 may be inserted into through-hole 522 of bridge element 520 to engage throughhole 513 of body element 510 to connect body element 510 with bridge element 520.

Pin 530, as shown, is a substantially straight pin that incorporates a slot 532 at a first end and larger area 534 at a second end. Slot 532 is used to capture lock washer 540, such that pin 530 is retained in place when body element 510 and bridge element 520 are joined. In one aspect of the invention, pin 530 includes a flat surface 536, which may be used to provide addition surface area to lock bridge element 520 to housing 110, as will be described.

Figure 6:
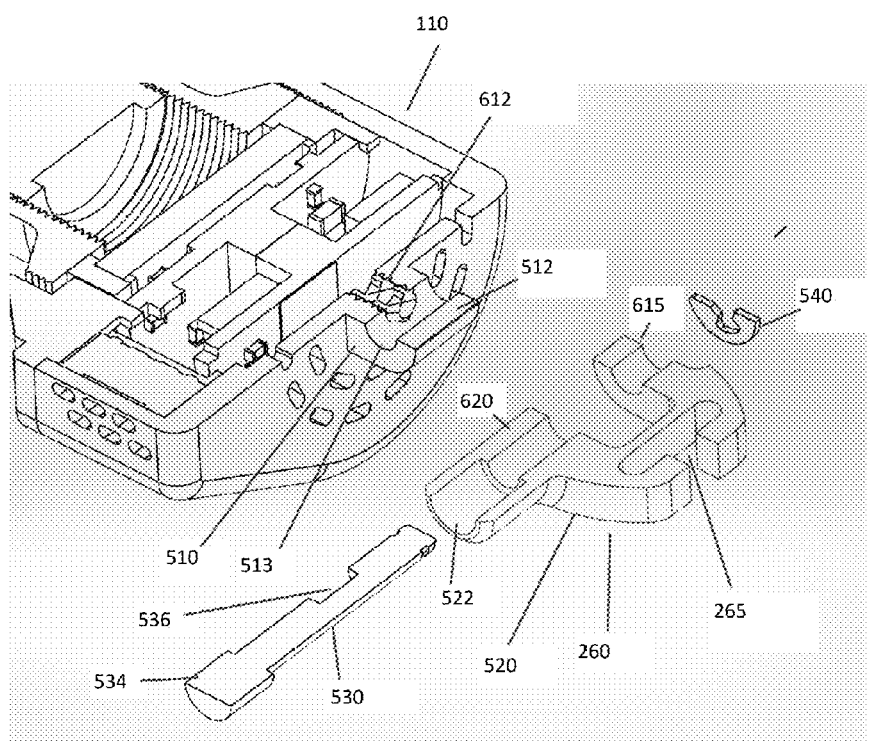
FIG. 6 illustrates a cross sectional view through section A-A of the adjustment and locking mechanism shown in FIG. 5 in accordance to an aspect of the invention.

FIG. 6 illustrates a cross sectional view, through section A-A of FIG. 5, of the adjustment and locking mechanism according to an aspect of the invention.

In this illustrated embodiment, the interleaving elements 615 and 620 on bridge element 520 are shown. In this exemplary configuration, body element 510 is connected to bridge element 520 though the mating of interleaving element 512 between interleaving elements 615 and 620. When pin 530 is inserted into through-holes 522 and 513, bridge element 520 and body element 510 are rotable about pin 530. Also shown is through-hole 612 in housing 110. Through-hole 612 includes a screw thread 614 into which a screw (not shown) may be threaded. The screw (not shown) may be used to engage pin 530 through the through-hole 612. The screw (not shown), which in a preferred embodiment may be a set screw, retains (or fixes) the orientation of body element 510 to the bridge element 520 by the application of pressure on pin 530. In a preferred embodiment, the pressure applied by the screw (not shown) in through hole 612 on pin 530 is applied to flat surface 536 on pin 530 to provide a maximum surface to which the pressure is applied.

Figure 7:
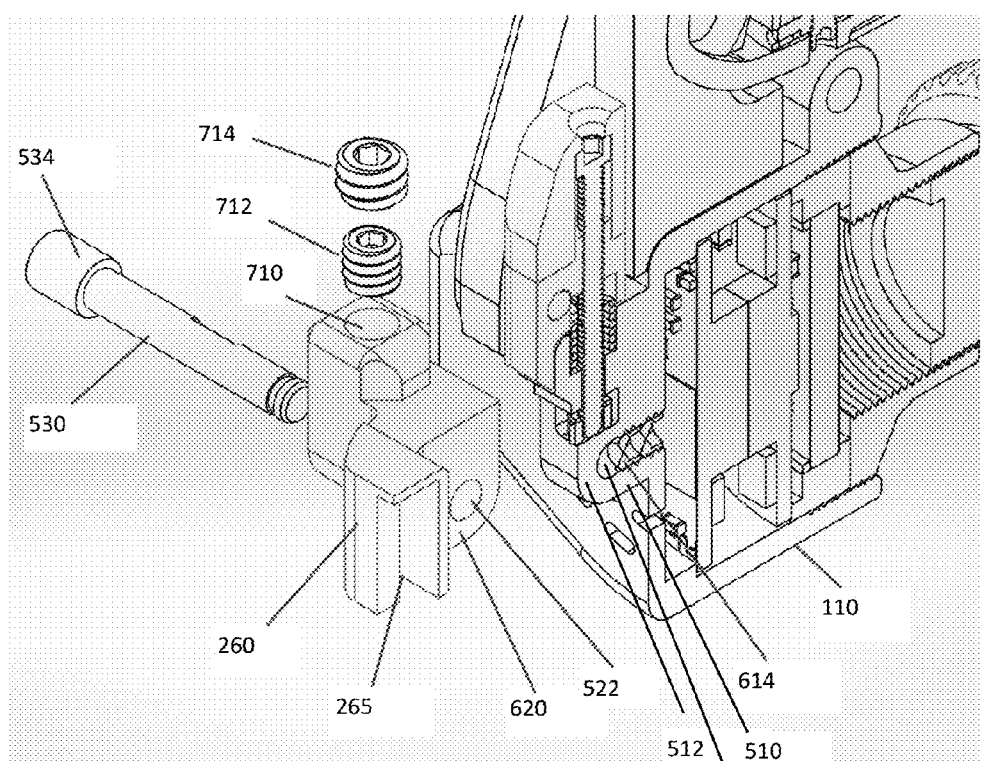
FIG. 7 illustrates a cross sectional view through section B-B of the adjustment and locking mechanism shown in FIG. 5 in accordance to an aspect of the invention.

FIG. 7 illustrates a cross-sectional view, through section B-B, FIG. 5, of the adjustment and locking mechanism in accordance with the principles of the invention.

In this illustrative exemplary embodiment, bridge attachment 520 includes a threaded screw hole 710 into which screw 712 may be placed. Screw 712, when inserted into screw hole 710, engages pin 530 inserted in through-hole 522. Screw 712 applies a pressure on pin 530 to lock the position of bridge element 520 with respect to body attachment 510. Once screwed in place, the angular orientation of body attachment 510 with respect bridge element 520 is retained (or fixed). In one aspect of the invention, screw 712 may be a set screw that engages pin 530.

In the illustrated embodiment, pin 530 includes an enlarged end 534 (i.e., a thumbscrew), which may be inserted into through-hole 522 (see FIG. 6). Screw 712 may, when screwed in position, engage the larger area of the enlarged end 534. The use of a larger area of enlarged end 534 is advantageous in order to provide a larger area upon which pressure may be applied screw 712. Although an enlarged end 534 of pin 530 is shown, it would be recognized that end 534 may be similar in size to pin 530 and screw 712 would equally engage the end 534 without altering the scope of the invention.

Also shown is a lock screw 714 that may be used to retain (or lock) screw 712 in place. Use of a lock screw 714 is advantageous to prevent screw 712 from becoming loose or backing out.

Although FIG. 7 illustrates screw 712 engaging enlarged area 534, it would be recognized that screw 712 may engage any portion of pin 530 and enlarged area 534 is merely used to provide a larger surface to which screw 712 engages pin 530.

Figure 8:
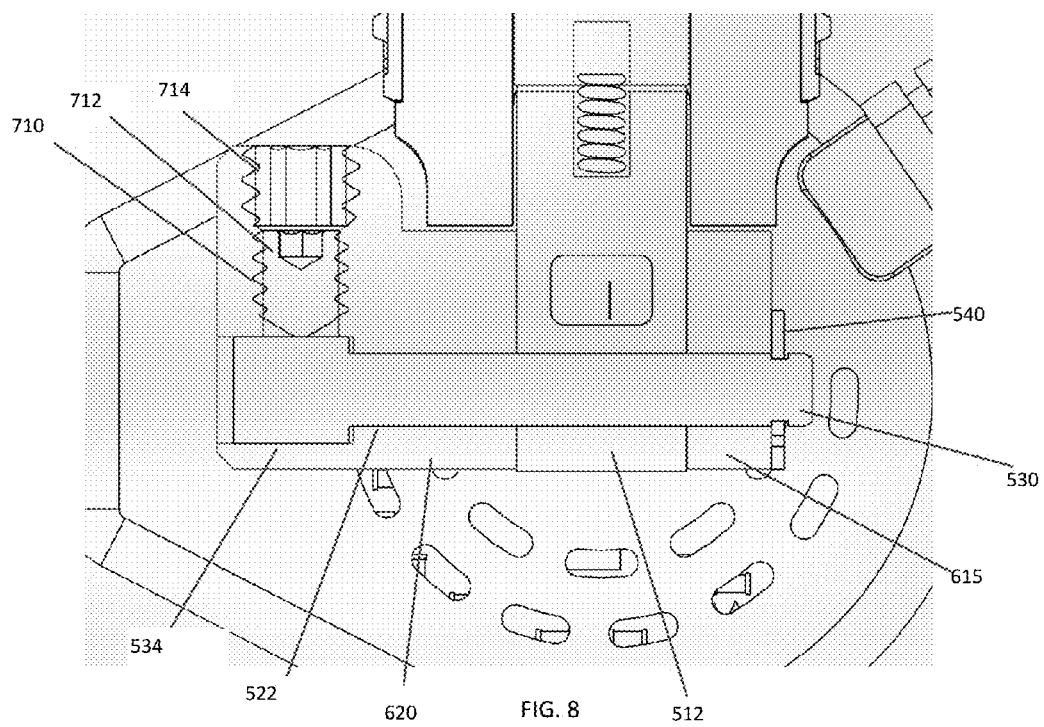
FIG. 8 illustrates a cross sectional view of the adjustment and locking mechanism in accordance with the principles of the invention.

FIG. 8 illustrates a cross sectional view of pin 530 inserted in through-holes 522 and 512 and retained in place by washer 540. Also shown is threaded screw hole 710 containing screw 712, which engages section 534. Locking screw 714 is also shown. As discussed locking screw 714 prevents screw 712 from loosening and changing the orientation of the body element 510 with the bridge element 520.

Figure 9:
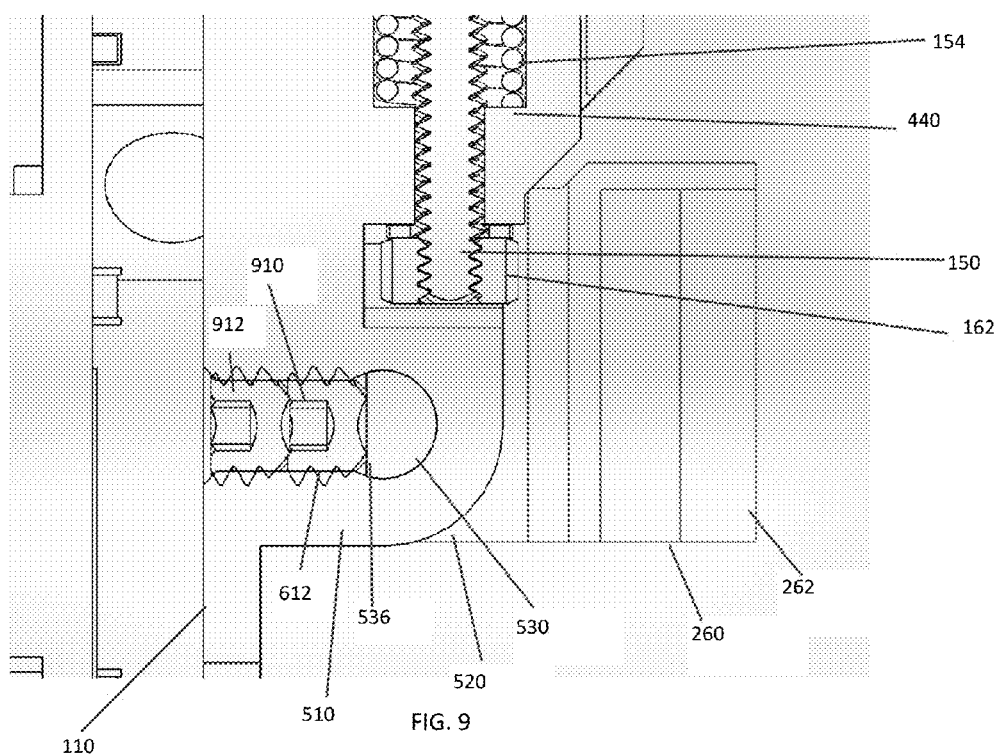
FIG. 9 illustrates a cross sectional view of the adjustment and locking mechanism in accordance with the principles of the invention.

FIG. 9 illustrates a cross sectional view of through hole 612 including screw 910 (which was not shown previously) engaging pin 530. In a preferred embodiment, screw 910 engages a flat area 536 of pin 530, as previously discussed. Also shown is a locking screw 912. Locking screw 912 prevents screw 910 from loosening and/or backing out.

Also shown is lead screw 150 inserted through spring 154 and engaging nut 162, as discussed with regard to FIG. 4. In one aspect of the invention, the housing 110 of device 100 and body element 510 may be integrated together, such that body element 510 and housing 110 are a single piece.

Figure 12:
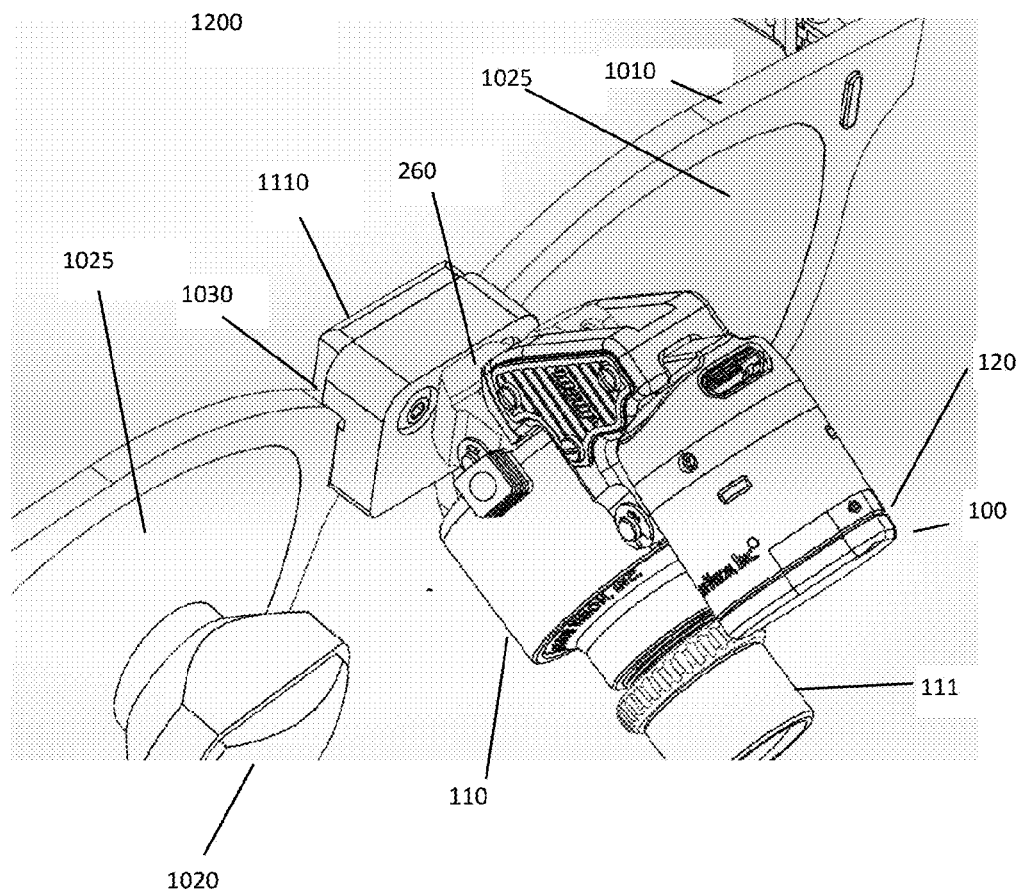
FIG. 12 illustrates a prospective view of an exemplary application of the adjustment and locking mechanism in accordance with the principles of the invention.

FIG. 12 illustrates a prospective view of an exemplary connection of the device 100 onto an eyewear in accordance with the principles of the invention.

Eyewear 1010 includes two lens 1025, each of which includes telescopic lens 1020 (of which only one is shown). Bridge 1030 joins lens 1025 together. Attached to bridge 1030 is connector element 1110. Connector element 1110 may be locked onto bridge 1030 by a screw mechanism attachment, for example. Alternatively, connector element 1110 may also be glued, welded or integrally formed onto bridge 1030. Also shown is connector 260 attached to connector element 1110. Connector 260 may be permanently attached to connector element 1110. Preferably, connector 260 may be removable from connector element 1110. In a preferred embodiment, removal of connector 260 from connector element 1110 is advantageous as it enables a user to incorporate device 100 (i.e., camera 111 and light 120) when desired.

Figure 13:
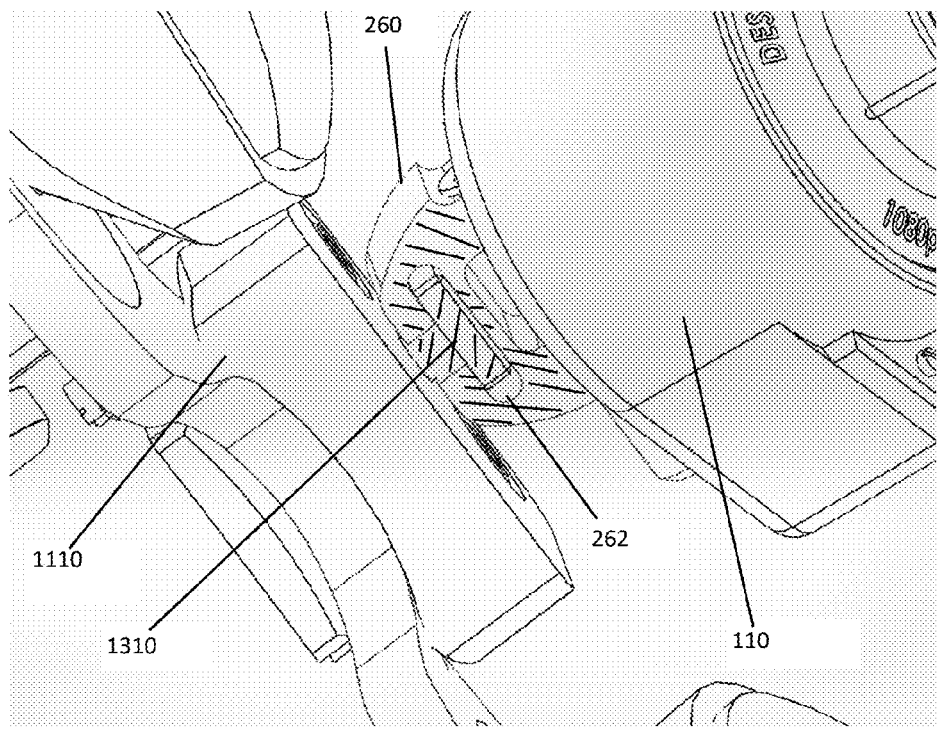
FIG. 13 illustrates a prospective view of an exemplary application of the adjustment and locking mechanism is accordance with the principles of the invention.

FIG. 13 illustrates a prospective view of the attachment of connector 260 with connector element 1110. In this illustrative embodiment, a "T-slot" connector is utilized. As discussed previously, connector 260 includes an internal "T-slot" element 262. Connector element 1110, in this illustrated example, includes an external "T-slot" element 1310. Engagement of element 262 with element 1110 locks device 100 in a same origination or configuration such that the viewing field of camera 111 is locked to the focal point of the telescopic lens 1020 (as shown in FIG. 11).

Although the present invention has been described with regard to an internal T-slot connection 262, it would be recognized that element 262 may also be an external T-slot connection and element 1110 be an internal T-slot connection without altering the scope of the invention. Although not shown it would be appreciated that the connection element 262 may also be a slot connector with a different cross-section, either internal or external, without altering the scope of the invention.

Although present invention has been described with regard to eyewear, it would also be appreciated that the assembly shown in FIG. 11 may be attached to a headband, without altering the scope of the invention.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A camera alignment device for aligning a light to a focal point of a camera, the device comprising:
   a housing containing the camera therein;
   a light fixture pivotedly attached to said housing at a substantially distal end of said housing and at a substantially distal end of said light fixture, said light fixture being adjustable with respect to said camera; and
   an adjustment device comprising:
      a first part extending from a proximal end of said housing, said first part comprising:
         an internally threaded screw hole extending through the first part from the proximal end of said housing; and
         a through hole substantially transverse to a direction of the screw hole; and
      a second part comprising:
         a first through hole transverse through said second part wherein the through hole of the first part and the first through hole of said second part are configured to be aligned, and
         a second through hole, substantially transverse to said first throughhole, said second through hole including an internal screw thread therein; and
      a pin configured to be inserted through both said through hole and said first through hole, wherein an orientation of said first part is fixed with respect to said pin by a screw engaging said pin through said screw hole and an orientation of said second part is fixed to said pin by an a screw engaging said pin through said second through hole.

2. The device of claim 1, wherein said second part further comprising:
   a connector.

3. The device of claim 2, wherein said connector is one of: an external T-slot and an internal T-slot.

4. The device of claim 1, wherein said pin includes:
   a shaft of a first diameter, said shaft including a flat surface.

5. The device of claim 4, wherein a first end of said shaft has a diameter greater than said first diameter.

6. The device of claim 1, wherein said first part is an integral part of the proximal end of said housing.

7. The device of claim 1, wherein said first part is screwed to the proximal end of said housing.

8. The device of claim 1, wherein said first part and said second part are rotatably about said pin.

\* \* \* \* \*